US011632773B2

(12) United States Patent
Siraj et al.

(10) Patent No.: US 11,632,773 B2
(45) Date of Patent: Apr. 18, 2023

(54) INTELLIGENT SCHEDULING OF WI-FI SERVICES FOR APPLICATIONS

(71) Applicant: Hewlett Packard Enterprise Development LP, Houston, TX (US)

(72) Inventors: Mohd Shahnawaz Siraj, San Jose, CA (US); Sachin Ganu, San Jose, CA (US); Qiang Zhou, SunnyVale, CA (US); Andre Beaudin, Montreal (CA); Parag Dedhia, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 50 days.

(21) Appl. No.: 17/342,142

(22) Filed: Jun. 8, 2021

(65) Prior Publication Data

US 2021/0298042 A1 Sep. 23, 2021

Related U.S. Application Data

(63) Continuation of application No. 16/810,439, filed on Mar. 5, 2020, now Pat. No. 11,051,320.

(51) Int. Cl.
*H04W 72/12* (2009.01)
*H04B 7/0452* (2017.01)
(Continued)

(52) U.S. Cl.
CPC ...... *H04W 72/1242* (2013.01); *H04B 7/0452* (2013.01); *H04L 5/0007* (2013.01);
(Continued)

(58) Field of Classification Search
None
See application file for complete search history.

(56) References Cited

U.S. PATENT DOCUMENTS

2015/0222552 A1 8/2015 Uppunda et al.
2016/0128079 A1 5/2016 Verma et al.
(Continued)

FOREIGN PATENT DOCUMENTS

| CN | 109845381 A | 6/2019 |
|---|---|---|
| CN | 109923930 A | 6/2019 |
| EP | 3474510 A1 | 4/2019 |

OTHER PUBLICATIONS

Kosek-Szott et al., "A Novel IEEE 802.11aa Intra-AC Prioritization Method for Video Transmissions", IEEE Globecom, 2014, 6 pages.

*Primary Examiner* — Christine T Duong
(74) *Attorney, Agent, or Firm* — Jaffery Watson Mendonsa & Hamilton

(57) ABSTRACT

Embodiments are directed to intelligent scheduling of Wi-Fi services for applications. An embodiment of computer-readable storage mediums includes instructions for receiving data packets from multiple connected devices at a wireless access point and identifying an application traffic flow for each data packet; assigning each data packet to a respective queue of a first set of queues based on an identified application traffic flow for each data packet; selecting data packets from the first set of queues based on priorities for each of multiple applications; generating prioritized candidate lists for selected data packets in a second set of queues, each queue being dedicated for an access category for one or more application; and scheduling data packets from the candidate lists, including selecting a transmission mode for each access category based on characteristics of the one or more applications.

20 Claims, 6 Drawing Sheets

(51) Int. Cl.
    *H04L 5/00*          (2006.01)
    *H04W 28/12*       (2009.01)
    *H04L 47/2441*     (2022.01)
    *H04L 47/62*       (2022.01)
    *H04W 8/04*        (2009.01)

(52) U.S. Cl.
    CPC ...... *H04L 47/2441* (2013.01); *H04L 47/6215* (2013.01); *H04W 8/04* (2013.01); *H04W 28/12* (2013.01)

(56) References Cited

U.S. PATENT DOCUMENTS

| | | |
|---|---|---|
| 2017/0373789 A1 | 12/2017 | Huang et al. |
| 2020/0125511 A1* | 4/2020 | Thubert ............ G06F 15/17331 |
| 2020/0178352 A1* | 6/2020 | Cho ................... H04L 41/0896 |

\* cited by examiner

INTELLIGENT SCHEDULING OF WI-FI SERVICES FOR APPLICATIONS

BACKGROUND

Wi-Fi transmission may utilize multiple different transmission protocols, which may include both OFDMA (Orthogonal Frequency-Division Multiple Access), which may be used to support low latency operations, and MU-MIMO (Multi-User Multiple-Input and Multiple-Output), which may be used to support high data throughput operations.

The IEEE 802.11ax standard, also referred to as Wi-Fi 6, provides support for both OFDMA and MU-MIMO modes of operation in uplink and downlink. These alternative modes allow for flexibility in supporting varying operations as both applications requiring low latency and operations requiring high data throughput will be supported by a particular access point (AP) that is operating under IEEE 802.11ax.

However, these modes of operation must be applied effectively in order to receive the full benefits of the technology. For example, in a system that is supporting multiple different applications for multiple clients, the latency and data requirements of each application may vary greatly. Further, there may be certain applications that should be prioritized in a particular environment.

Thus, there are multiple different factors to be balanced in scheduling under IEEE 802.11ax, creating complications and overhead costs for system operators in making scheduling decisions.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
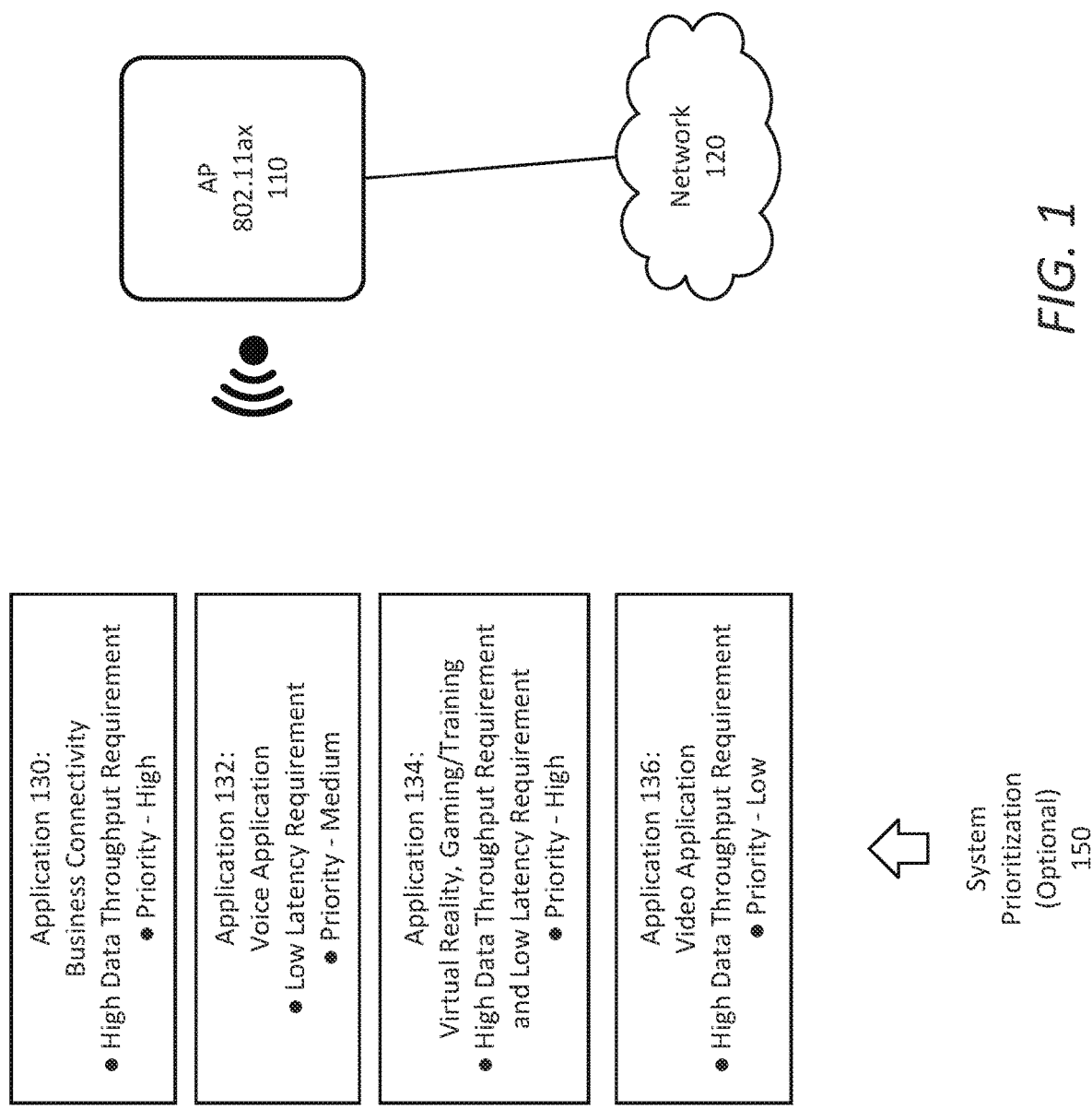
FIG. 1 is an illustration of intelligent scheduling of applications for Wi-Fi services, according to some embodiments.

Embodiments described herein are directed to intelligent scheduling of Wi-Fi services for applications.

The IEEE (Institute of Electrical and Electronics Engineers) 802.11ax standard, referred to as Wi-Fi 6, provides multiple capabilities to improve the efficiency of wireless networks using infrastructure coordinated multi-user uplink and downlink transmissions. Wi-Fi 6 enables multiple constructs to allow for effective operations, including:

OFDMA (Orthogonal Frequency Division Multiple Access): OFDMA enables an access point to simultaneously communicate with multiple devices by dividing each Wi-Fi channel into smaller sub-channels known as Resource Units (RU) and allocating the sub-channels for different clients.

MU-MIMO (Multi-user Multiple-Input Multiple-Output): MU-MIMO supports multiple users simultaneously in access point operation using a multi-transmitter/receiver technology. It is noted that SU-MIMO (Single User MIMO) is also available as needed, wherein SU-MIMO allocate the full bandwidth of the access point to a single high-speed device during an allotted time slice.

TWT (Target Wake Time): TWT enables devices to determine when and how frequently they will wake up to send or receive data, which allows 802.11ax access points to increase device sleep time and conserve battery life.

Access Category (AC)—Prioritization may be based upon AC, enabling prioritization of categories of data.

However, these services must be applied appropriately to maximize the benefits that are available. In particular, Wi-Fi services need to be scheduled appropriately to meet guaranteed service level agreements (SLAs) for mission critical applications. Different applications will require different treatment in terms of allocating the wireless resources that are available from an access point. For example, a voice application will have low jitter tolerance, such as less than 20 ms, while a video streaming application will generally have higher bandwidth requirements. Newer use cases such as virtual reality (VR) for gaining, training, and other operations may require both high bandwidth and low latency guarantees in order to provide acceptable user experience.

Further, different deployments may have a different set of preferred applications depending on the particular environment. In a typical office environment, an IT administrator may wish to give preferential treatment for business enterprise applications, such as office tools, video conferencing, sales support, and file storage applications, while in environments such as university dormitories gaming and media streaming applications may be dominant and may require higher priority. Other environments, such as medical facilities, may include use of special purpose applications for staff that need to be prioritized.

In some embodiments, an apparatus, system, or process provides intelligent scheduling of Wi-Fi applications utilizing "AirSlice" technology. AirSlice operates to allocate a virtual slice of Wi-Fi spectral resources, based on policies per device, per user, or per user role, to support each client through use of a combination of multiple sets of dedicated queues and 802.11ax MAC scheduling enhancements.

In some embodiments, AirSlice technology allow for optimizing selection between transmission modes for each of multiple applications for client operations, while supporting application priorities. Further, AirSlice allows for greater granularity in allocation of resources than conventional tools, allowing for related types of applications to be treated differently in certain circumstances. In one example, two different voice applications may be assigned different priorities if, for instance, a first voice application is a preferred enterprise application for an environment while the second application is a general voice application that has not been allocated the same level of importance in the environment.

The AirSlice technology allows for isolating a network operator from the underlying complexities of Wi-Fi scheduling, including 802.11ax scheduling, by presenting an interface for the operator to optionally select one or more priority applications, and incorporating this priority selection into classification, prioritization, and scheduling decisions within the access points. The technology provides means for maintaining QoS (Quality of Service) metrics for each client to provide acceptable user experience, while prioritizing applications as appropriate for an environment.

In some embodiments, the AirSlice technology utilizes multiple constructs that are made available by 802.11ax, the constructs including OFDMA, MU-MIMO, and TWT, with the ability to support multiple different types of services. The services may include gaming, voice/video, IoT (Internet of Things) workflows, and in general applications requiring low latency, high bandwidth, or both, with varying priorities.

In the selection of services, OFDMA increases overall efficiency by serving multiple client devices simultaneously using narrower channel bandwidth and also amortizing the preamble overhead among users, and is preferred for low-bandwidth applications that are delay/jitter sensitive. On the other hand, MU-MIMO increases the overall capacity by providing higher speeds per user, and is preferred for high-bandwidth applications that are less delay or jitter sensitive. In some embodiments, AirSlice technology is applied intelligently select the scheduling mechanism between OFDMA and MU-MIMO based on the type of application that is being served, while applying any applicable application priorities. In some embodiments, the technology may further provide for SU-MIMO (Single User MIMO) when such operation would provide the best performance, such as when high bandwidth is required but MU-MIMO isn't available or practical for any reason.

In some embodiments, intelligent scheduling of Wi-Fi resources may be supported for all clients, including clients that are not utilizing 802.11ax. However, the benefits of AirSlice will be particularly useful for 802.11ax clients because 802.11ax provides mechanisms for more efficient traffic scheduling in both uplink and downlink directions. The AP is to manage the uplink resource allocation and schedule the uplink access for increased capacity and efficiency by minimizing the resource contention across multiple users. Further, TWT allows the AP and clients to negotiate specific times to access the medium. This reduces the contention and overlap between the users, which can increase device sleep time and reduce the AP power consumption.

As used herein, access point (AP) (also referred to as a wireless access point (WAP)) refers to a Wi-Fi networking hardware device that allows Wi-Fi devices to connect to a wired network, including connection to the Internet or an intranet. The AP may connect to a router (via a wired network) as a standalone device, or may be an integral component of the router itself. As used herein, Wi-Fi refers to operation under one or more IEEE 802.11 protocols.

As used herein, station (STA) refers to a device including the capability to utilize IEEE 802.11 protocols, and may include, but is not limited to, a laptop, a desktop PC, tablet, or Wi-Fi enabled cell phone.

FIG. 1 is an illustration of intelligent scheduling of applications for Wi-Fi services, according to some embodiments. As illustrated in FIG. 1, a system may include an access point 110 to provide a connection to a network 120, wherein the access point 110 includes support for 802.11ax (Wi-Fi 6) providing both OFDMA and MU-MIMO modes of operation. In some embodiments, the access point 110 further provides for support of SU-MIMO for applications if needed. In some embodiments, the access point is to provide intelligent scheduling of applications, including selection between the available transmission modes to provide full support of QoS requirements of each application.

In an example, the access point 110 provides support for multiple different applications for multiple stations, with each application having differing characteristics and priorities, where the priorities may optionally include system priorities for certain applications 150, such as certain enterprise applications that used in a particular environment.

As illustrated in FIG. 1, the types of applications being supported may include, for example:

Application 130—Application may be an enterprise business connectivity application providing multiple communication, planning, and work cooperation tools. The application 130 may have a high data throughput requirement and a high priority level.

Application 132—Application may be a voice application, the voice application having a low latency requirement (the application being sensitive to jitter, which can have a significant negative effect on user experience), but having a relatively low bandwidth requirement. The application may be presumed to have a medium priority level.

Application 134—Application may be an virtual reality (VR) application, such as utilized for gaming, training, or other purposes. Because of the nature of VR operations, the application may have both a high data throughput (high bandwidth) requirement and a low latency requirement. In this example, the application may be presumed to have a high priority level.

Application 136—Application may be a video application, which may have a high data throughput requirement, depending on the user of the application. However, the application may have a low priority level.

In some embodiments, the access point 110 provides for intelligent scheduling of data packets for the applications 130-136, selecting between OFDMA and MU-MIMO based on the characteristics of each application being served, utilizing the concept of slicing of the spectral resources, with a virtual slice being provided to prioritize applications that are important to enterprises and provide guaranteed QoS for end-to-end operation. Applications are identified regarding high throughput demands, low latency requirements, or both, and the system intelligently selects between OFDMA and MU-MIMO based on the type of application being served, with multiple queues being established having parameters to match the application profiles, as well as priority of scheduling. The access point may further select SU-MIMO operation for an application if required, such as when high bandwidth is required but MU-MIMO isn't available or practical for any reason. Each packet is identified with the relevant application traffic flow to allow placement in a proper queue for scheduling.

In some embodiments, the access point 110 further allows a client to optionally prioritize certain applications according to the needs of the client 150, wherein the client prioritization is incorporated into classification, prioritization and scheduling decisions within the access point to enable to maintenance of QoS metrics for acceptable user experience. As described above, the prioritization may depend on the particular environment, and thus may favor different application in different environments. Further, the prioritizations may be modified over time, dependent on the needs of a particular operator.

Figure 2:
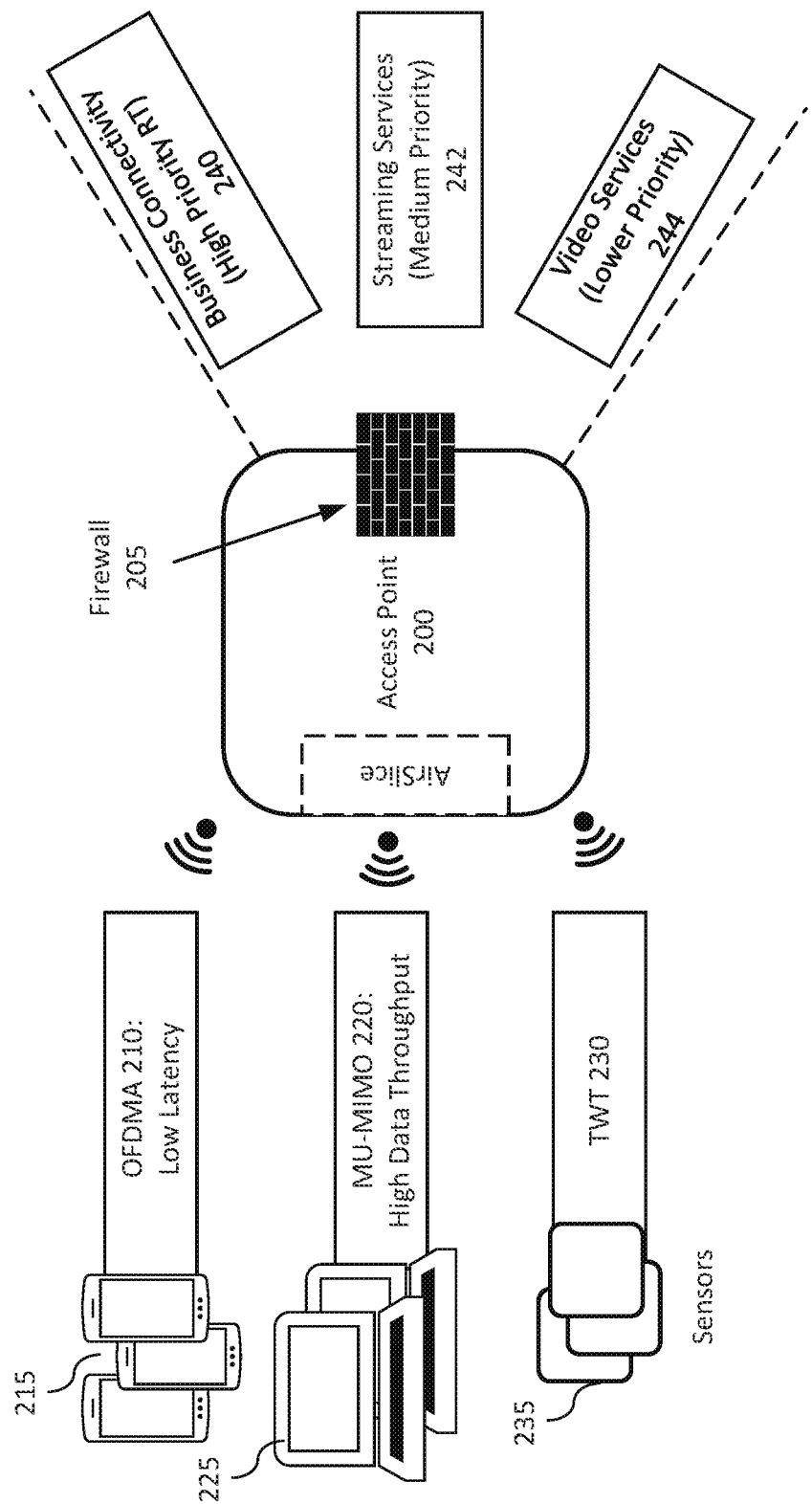
FIG. 2 is an illustration of access point operations to provide intelligent scheduling of Wi-Fi services for applications, according to some embodiments.

FIG. 2 is an illustration of access point operations to provide intelligent scheduling of Wi-Fi services for applications, according to some embodiments. In some embodiments, an access point 200 is to provide for intelligent scheduling of Wi-Fi services for multiple applications in an environment. The access point 200 includes AirSlice technology to enable effective operations for different types of applications and to ensure QoS and prioritization standards are met for each application that is being served.

For example, the access point 200 may select OFDMA transmission 210 to address applications that require low latency, such as the illustrated cell phones or mobile devices 215 that may be utilized for live video chat or other similar features that cannot tolerate significant jitter. The access point 200 may select MU-MIMO transmission 220 to address applications that require high throughput, such as the illustrated laptop computers 225 that may be transferring large amounts of data for work platforms, gaming processes, or other uses. Further, the access point 200 may utilize other tools, including target wake time (TWT) 230 to enable effective sleeping operations, such as for IoT (Internet of Things) sensors 235 or other similar elements, allowing for reduction in power usage.

Further, the access point 200, including operation of a firewall 205, provides prioritization of data communication based at least in part on the particular application being addressed, including, for illustration, business connectivity applications that are high priority and require real-time (RT) performance 240; streaming services that are allocated medium priority to provide acceptable user experience 242; and video services that may be allocated lower priority 244. Other examples may be provided with various different priorities. The priorities may be affected by optional administrator preferences depending on the particular environment, system use and capabilities, and other factors.

In some embodiments, the access point 200 is to include knowledge regarding application characteristics and operation, and is to apply this knowledge in the AirSlice scheduling of application traffic.

Figure 3:
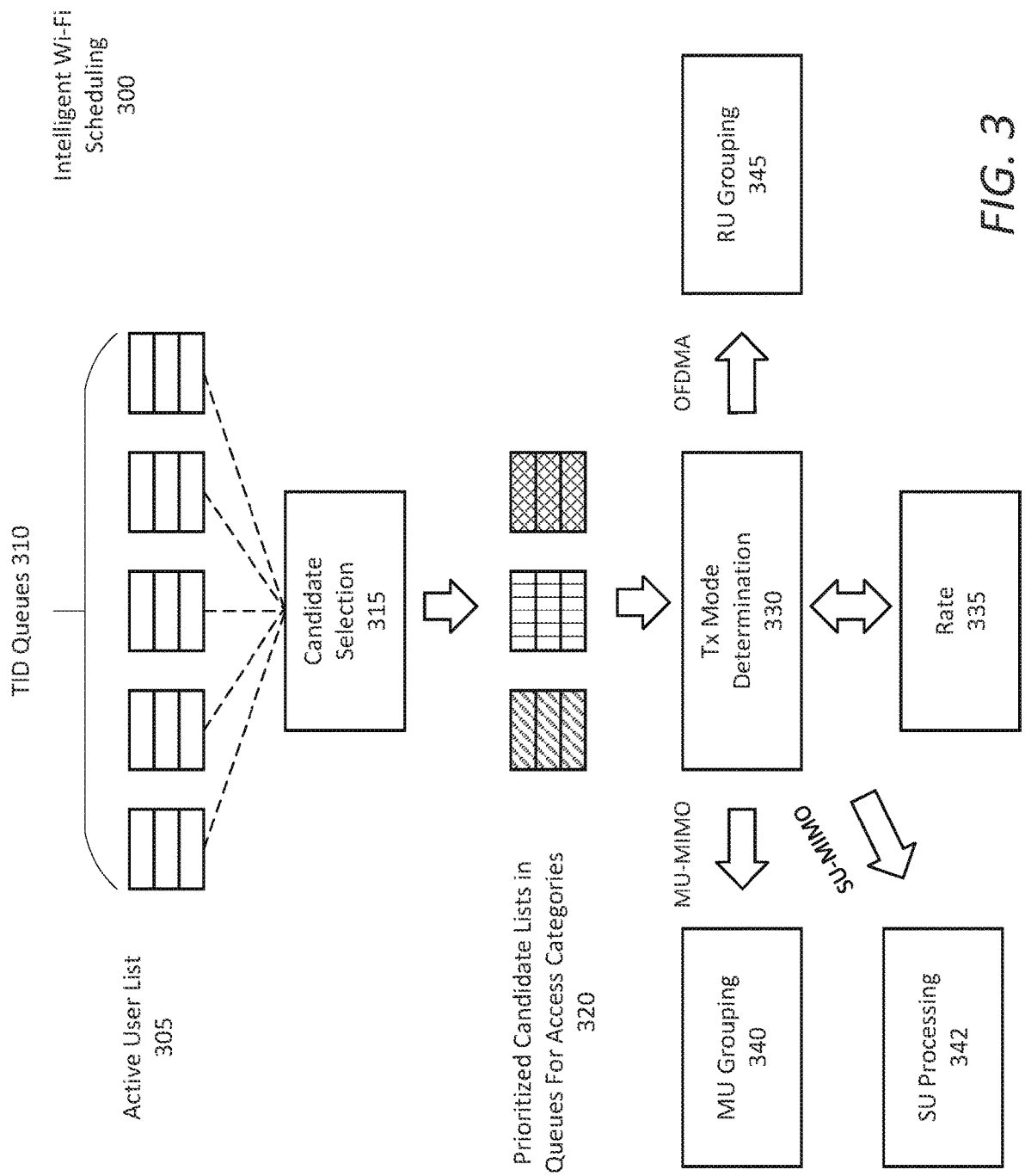
FIG. 3 is an illustration of intelligent scheduling of applications at an access point according to some embodiments.
Figure 4:
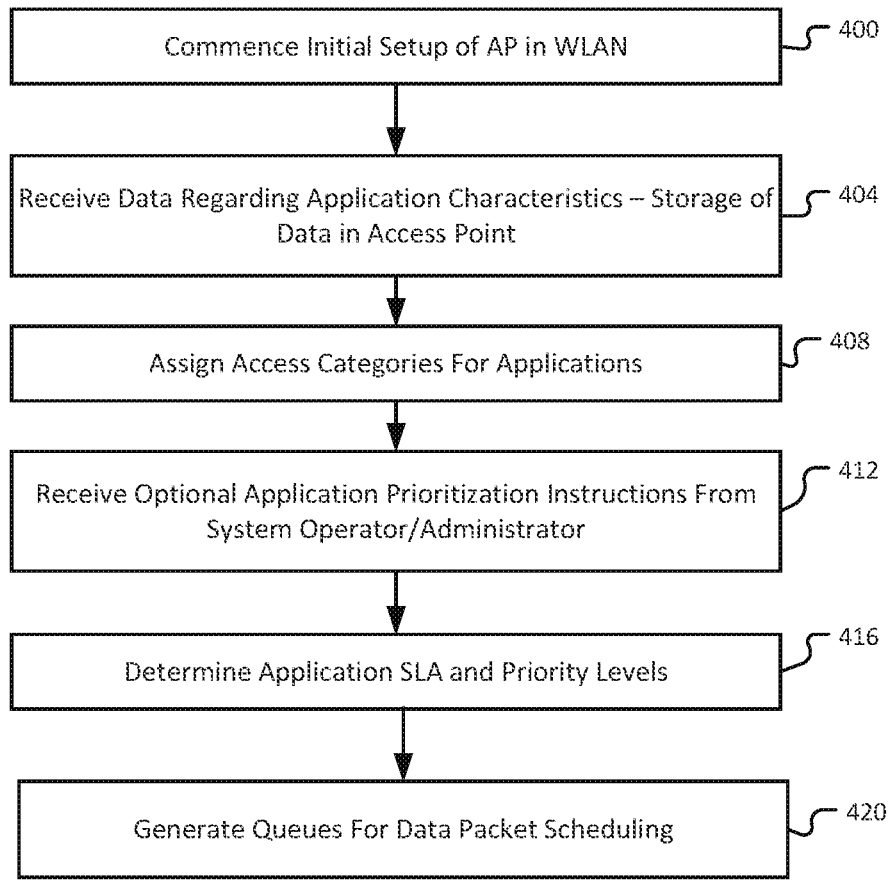
FIG. 4 is a flow chart to illustrate initial processes for intelligent scheduling of applications according to some embodiments.
Figure 5:
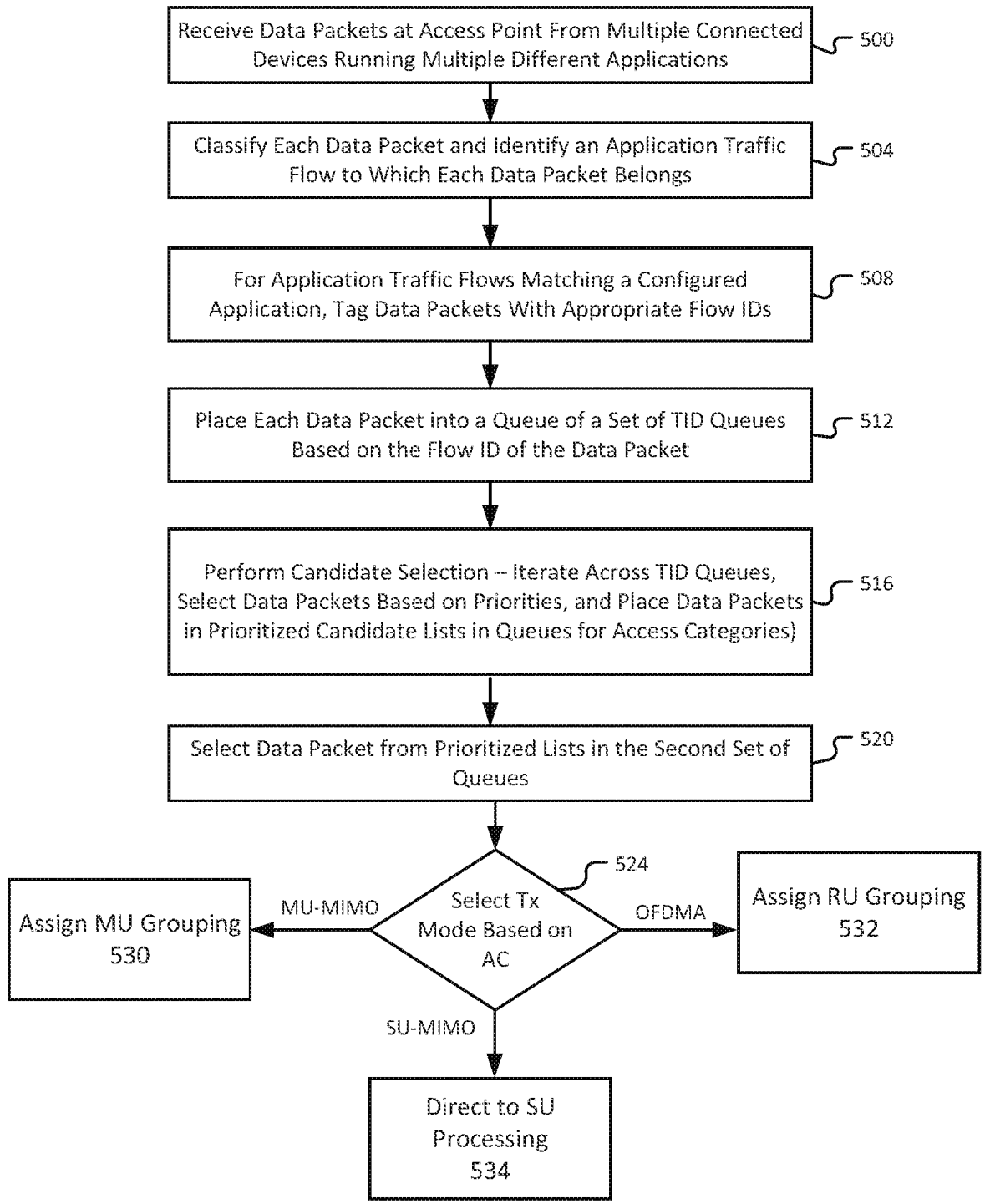
FIG. 5 is a flow chart to illustrate intelligent scheduling of applications according to some embodiments.

The operations for scheduling of data packets are further illustrated in FIGS. 3-5.

FIG. 3 is an illustration of intelligent scheduling of applications at an access point according to some embodiments. As illustrated in FIG. 3, multiple dedicated queues and 802.11ax MAC scheduling enhancements are utilized to provide intelligent scheduling of Wi-Fi services 300.

In some embodiments, intelligent scheduling of Wi-Fi services 300 includes use of a first set of queues, the first set of queues being a set of active TID (Traffic Identifier) queues 310 for an active user list 305, wherein a TID is a identifier to classify each data packet as to the type of data. In some embodiments, WLAN software of an access point will include designation of dedicated hardware and/or software queues to match the application profile of each specified applications. The parameters of such queues 310 are tuned to match the relevant application profile. Each TID queue may have different priority application traffic, with data packets to be queued based on the requirements for the application traffic flow. In some embodiments, the deep packet inspection (DPI) is to classify each data packet and identify the application traffic flow to which the data packet belongs. If the packet flow ID matches with that of a configured application, the DPI is to tag the data packet with the flow ID so that WLAN software can place the packet in the correct queue of the TID queues 310.

In some embodiments, during a scheduling operation, a scheduler is to iterate across all the TID queues 310 to select a candidate set of clients 315 based on priorities that are set for the data packets, wherein the priorities are established utilizing the access category that is assigned for each application. In some embodiments, certain traffic, such as specific enterprise application traffic, may be prioritized over other application and background traffic.

The scheduler is then to generate prioritized candidate lists of data packets in a second set of queues 320, wherein each queue of the second set of queues represents an access category. In some embodiments, the scheduler is then to determine an appropriate transmission mode 330 for each data packet based on the access categories of the second set of queues. The transmission mode determination 330 includes use of data rates 335.

In a first example, the scheduler may select a data packet from a first prioritized candidate list and select the MU-MIMO transmission mode for the data packet, with the data packet being sent to the appropriate MU grouping 340 for transmission. In a second example, the scheduler may select a data packet from a second prioritized candidate lists and select OFDMA transmission mode for the data packet, with the data packet being sent to the appropriate RU grouping 345. In certain circumstances the scheduler may also select single user (SU) processing 342 for data if this selection, wherein a single user is provided the multiple-input, multiple output operation, provides for best efficiency in a certain circumstance.

In some embodiments, transmit mode selection is determined for each AC based on the characteristics of the applications, and specifically based on whether an application requires low latency, whether the application requires high data throughput, or both. In some embodiments, within each AC, the transmit mode for a STA may further be limited as follows:

(a) The transmit rate in MU transmit mode is not to be less than a given threshold for optimal performance, typically MCS (Modulation and Coding Scheme) 4.

(b) The minimum time between the total payload of all application traffic flows of this STA is larger than $T_{min}$, where $T_{min}$ is a threshold value to guarantee certain MAC efficiency using MU. For example, the setting can be $T_{min}$=300 μs (or other appropriate threshold value). If such requirement, is not met, the transmit mode may instead be OFDMA or SU.

In some embodiments, the scheduler is to further to apply delay constraints in the scheduling of data traffic. To meet the desired maximum delay of stations (STAs), the scheduler is to apply a scheduling metric to rank the STAs on the delay performance d/D, where 'd' denotes the current channel access delay of the application traffic flow. For example, the delay metric may be the following:

For application traffic flows that are sensitive to delay/jitter (such as voice or video applications), D=20 ms (or other appropriate first value).

For application traffic flows that are less sensitive to delay/jitter (such as email or web applications), D=100 ms to 1 Sec (or other appropriate second value).

FIG. 4 is a flow chart to illustrate initial processes for intelligent scheduling of applications according to some embodiments. FIG. 4 and FIG. 5 in particular provide illustration of processes for AirSlice technology to allocate a virtual slice of Wi-Fi spectral resources, allocated based on policies per device, per user, or per user role, to support each of multiple connected devices, with the operation utilizing a combination of multiple dedicated queues and 802.11ax MAC scheduling enhancements.

In some embodiments, upon initial setup of an access point in a WLAN 400, the access point may receive data regarding application characteristics 404 to enable the access point to evaluate data packets. The application characteristics may include whether a particular application requires high data throughput (high bandwidth), low latency in operation (low jitter tolerance), or both. For example, a voice application will generally have low jitter tolerance, a video streaming application will generally have high bandwidth requirements, and virtual reality (VR) may require both high bandwidth and low latency guarantees. The data regarding application characteristics may be stored as required, such as in a database 625 illustrated in FIG. 6. The process then includes assigning access categories to applications for use in scheduling of data packets 408.

In some embodiments, the access point is to receive optional prioritization instructions from a system operator or administrator 412. The prioritization instructions may select certain applications to receive higher or low priority in a particular installation, and selections are to be incorporated into classification, prioritization, and scheduling decisions within the access point. For example, certain enterprise applications may require prioritization in certain environments. The prioritization instructions may vary based on the particular environment, and may be modified over time to changes which applications are to be prioritized.

In some embodiments, the application SLA and priority levels are to be determined for use in scheduling the data packets 416. The SLA and priority levels may be determined from application characteristics and optional prioritization instructions. In a particular example, there may be four different priority levels that may be assigned for varying applications. However, any number of priority levels may be utilized in an operation.

In some embodiments, the process may include generation of queues for data packet scheduling 420. The queues may include a first set of queues for each client, such as the TID queues 310 illustrated in FIG. 3, and second set of queues for prioritized candidate lists, such as the queues 320 illustrated in FIG. 3. The queues may be dedicated in software or hardware, depending on the installation.

Upon the completions of the processes for initialization as illustrated in FIG. 4, a process may provide for intelligent scheduling of applications as illustrated in FIG. 5.

FIG. 5 is a flow chart to illustrate intelligent scheduling of applications according to some embodiments. In some embodiments, data packets are received from multiple connected devices 500, wherein each device may be running a different application with different characteristics and priorities. In some embodiments, deep packet inspection (DPI) is used to classify each data packet and identify the application traffic flow to which the data packet belongs 504.

If the application traffic flow for any data packet matches the application traffic flow of a particular configured application, the DPI is to tag the data packet with the appropriate flow ID 508. The WLAN software is then to place each data packet into a queue of a first set of multiple TID queues based at least in part on the flow ID of the data packet 512. The first set of queues may include the TID queues 310 as illustrated in FIG. 3.

In some embodiments, a scheduler is to perform candidate selection of the data packets 516, the process including iterating across the first set of TID queues, selecting candidate data packets from the TID queues based on priorities that have been set for the respective applications, and generating prioritized candidate lists in a second set of queues, wherein each queue of the second set of queues represents a particular access category. The second set of queues may include the queues 320 containing prioritized candidate lists as illustrated in FIG. 3.

In some embodiments, the scheduler is select a data packet from the prioritized lists based on priority 520, and is to select an appropriate transmission mode for the data packet based on the access category for represented by each queue in the second set of queues 524. The transmission modes may include modes that are supported by the 802.11ax protocol, which include MU-MIMO, OFDMA, and SU-MIMO transmission modes.

As illustrated in FIG. 5, if the selected transmission mode for the data packet is MU-MIMO, the relevant data packet is directed to MU grouping for transmission 530; if the selected transmission mode for the data packet is OFDMA, the data packet is assigned to RU grouping for transmission 532; and if the selected transmission mode is SU-MIMO, the data packet is directed to SU processing for transmission 534.

As described above, MU-MIMO operated to increase the overall capacity in an access point by providing higher speeds per user, and is preferred for high-bandwidth applications that are less delay or jitter sensitive; OFDMA increases overall efficiency by amortizing the preamble overhead among users, and is preferred for low-bandwidth applications that are delay/jitter sensitive; and SU-MIMO may be applied when high bandwidth is required but MU-MIMO isn't available or practical for any reason.

Figure 6:
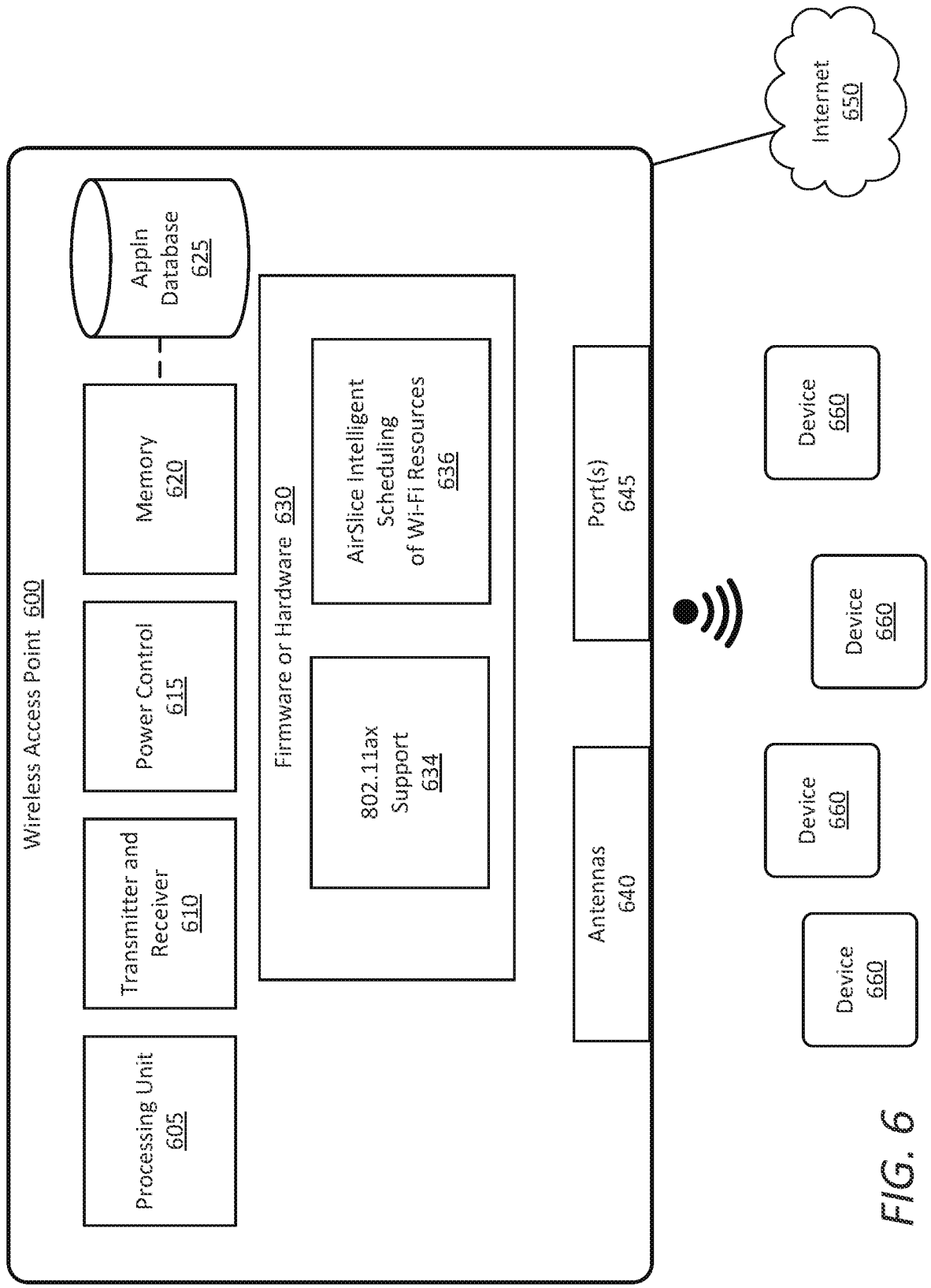
FIG. 6 illustrates an access point to provide intelligent scheduling of Wi-Fi resources for application data. according to some embodiments.

FIG. 6 illustrates an access point to provide intelligent scheduling of Wi-Fi resources for application data. according to some embodiments. An access point includes additional components and elements not illustrated in FIG. 6, which is simplified for sake of illustration. The illustrated access point 600 may include an access point including capability to operate under the IEEE 802.11ax standard, the wireless access point 600 to support both MU-MIMO and OFDMA modes, and may further provide support for SU-MIMO.

The access point 600 may include a processing unit 605, a transmitter and receiver 610, power control 615, and one or more memories 620 for the storage of data, which may include volatile memory (such as DRAM (Dynamic Random Access Memory)) and nonvolatile memories (such a ROM (Read Only Memory), flash memory, and other memory technologies). In some embodiments, the memory 620 may include storage of an application database 625 to store data regarding characteristics of multiple applications for use in selecting a transmission mode for each data packet to be handled by the access point 600 for client operations. The memory 620 may further include storage of WLAN software to perform data transmission operations.

In some embodiments, the access point 600 includes firmware or hardware 630 to support operations using multiple different transmission modes. The firmware or hardware includes IEEE 802.11ax support for tools 634, including MU-MIMO, SU-MIMO and OFDMA transmission modes. In some embodiments, the firmware or hardware 630 includes AirSlice intelligent scheduling of Wi-Fi resources 636, including prioritized scheduling of MU-MIMO, SU-MIMO and OFDMA transmission modes for data packets for multiple different applications having differing characteristics in order to optimize operations for multiple applications.

The access point 600 further includes multiple antennas 640 for wireless signal communication, and one or more ports 645 for network connections or other connections, including network uplink to the Internet 650.

The access point 600 may for example include capability for providing intelligent scheduling to schedule virtual slices of Wi-Fi resource to support data for multiple different applications run on multiple connected devices 660, the scheduling utilizing a combination of multiple dedicated queues, such as TID queues 310 and the prioritized candidate lists in queues 320 for access categories illustrated in FIG. 3, to provide for optimizing selection between the transmission modes for each of the multiple applications of the multiple devices 660.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums having stored thereon executable computer program instructions that, when executed by one or more processors, cause the one or more processors to perform operations including: receiving a plurality of data packets from a plurality of connected devices at a wireless access point and identifying an application traffic flow for each data packet of the plurality of data packets; assigning each data packet of the plurality of data packets to a respective queue of a first plurality of queues based at least in part on an identified application traffic flow for each data packet; selecting data packets from the first plurality of queues based at least in part on priorities for each of a plurality of applications; generating prioritized candidate lists for selected data packets in a second plurality of queues, each queue of the second plurality of queues being dedicated for an access category (AC) for one or more application; and scheduling data packets from the prioritized candidate lists, including selecting one of a plurality of transmission modes for each access category based at least in part on characteristics of the one or more applications, wherein the plurality of transmission modes includes MU-MIMO and OFDMA.

In some embodiments, a wireless access point includes one or more processors; a wireless transmitter and receiver, wherein the wireless access point supports a plurality of transmission modes including MU-MIMO and OFDMA; and a memory including information regarding characteristics of a plurality of applications, wherein the wireless access point is to receive a plurality of data packets from a plurality of connected devices and identifying an application traffic flow for each data packet of the plurality of data packets, assign each data packet of the plurality of data packets to a respective queue of a first plurality of queues based at least in part on an identified application traffic flow for each data packet, select data packets from the first plurality of queues based at least in part on priorities for each of a plurality of applications, generate prioritized candidate lists for selected data packets in a second plurality of queues, each queue of the second plurality of queues being dedicated for an access category (AC) for one or more application, and schedule data packets from the prioritized candidate lists, including selecting one of a plurality of transmission modes for each access category based at least in part on characteristics of the one or more applications.

In some embodiments, a method includes receiving a plurality of data packets from a plurality of connected devices at a wireless access point and identifying an application traffic flow for each data packet of the plurality of data packets; assigning each data packet of the plurality of data packets to a respective queue of a first plurality of queues based at least in part on an identified application traffic flow for each data packet; selecting data packets from the first plurality of queues based at least in part on priorities for each of a plurality of applications; generating prioritized candidate lists for selected data packets in a second plurality of queues, each queue of the second plurality of queues being dedicated for an access category (AC) for one or more application; and scheduling data packets from the prioritized candidate lists, including selecting one of a plurality of transmission modes for each access category based at least in part on characteristics of the one or more applications, wherein the plurality of transmission modes includes MU-MIMO and OFDMA.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
    assigning each data packet of a plurality of data packets to a respective queue of a first plurality of queues based at least in part on an identified application traffic flow for each data packet;
    generating prioritized candidate lists for selected data packets selected from the first plurality of queues in a second plurality of queues, each queue of the second plurality of queues being dedicated for an access category (AC) for one or more application; and
    scheduling data packets from the prioritized candidate lists, including selecting one of a plurality of transmission modes for each access category based at least in part on characteristics of the one or more applications, wherein the plurality of transmission modes includes MU-MIMO (Multi-user Multiple-Input Multiple-Output) and OFDMA (Orthogonal Frequency Division Multiple Access).

2. The one or more storage mediums of claim 1, wherein the selection of a transmission mode for an access category includes:
    selecting MU-MIMO based at least in part on one or more applications requiring high bandwidth in operation; and
    selecting OFDMA based at least in part on one or more applications requiring low latency in operation.

3. The one or more storage mediums of claim 1, wherein the plurality of transmission modes further includes SU-MIMO (Single User MIMO).

4. The one or more storage mediums of claim 1, wherein each queue of the first plurality of queues is dedicated to data packets for a particular application profile.

5. The one or more storage mediums of claim 1, further including instructions for:
    allocating a virtual slice of Wi-Fi resources to each connected device based on policies per device, per user, or per user role.

6. The one or more storage mediums of claim 1, further including instructions for:
    receiving prioritization instructions for one or more applications and applying the prioritization instructions in the scheduling of the data packets.

7. The one or more storage mediums of claim 1, wherein the access point operates under IEEE 802.11ax protocol.

8. A wireless access point comprising:
    one or more processors;
    a wireless transmitter and receiver, wherein the wireless access point supports a plurality of transmission modes including MU-MIMO (Multi-user Multiple-Input Multiple-Output) and OFDMA (Orthogonal Frequency Division Multiple Access); and
    a memory, wherein the wireless access point is to:
        assign each data packet of a plurality of data packets to a respective queue of a first plurality of queues based at least in part on an identified application traffic flow for each data packet,
        generate prioritized candidate lists for data packets selected from the first plurality of queues in a second plurality of queues, each queue of the second plurality of queues being dedicated for an access category (AC) for one or more application, and
        schedule data packets from the prioritized candidate lists, including selecting one of a plurality of transmission modes for each access category based at least in part on characteristics of the one or more applications.

9. The wireless access point of claim 8, wherein the selection of a transmission mode for an access category includes:
    selecting MU-MIMO based at least in part on one or more applications requiring high bandwidth in operation; and
    selecting OFDMA based at least in part on one or more applications requiring low latency in operation.

10. The wireless access point of claim 8, wherein the plurality of transmission modes further includes SU-MIMO (Single User MIMO).

11. The wireless access point of claim 8, wherein each queue of the first plurality of queues is dedicated to data packets for a particular application profile.

12. The wireless access point of claim 8, wherein the wireless access point is to allocate a virtual slice of Wi-Fi resources to each connected device based on policies per device, per user, or per user role.

13. The wireless access point of claim 8, wherein the wireless access point is to receive prioritization instructions for one or more applications and apply the prioritization instructions in the scheduling of the data packets.

14. The wireless access point of claim 8, wherein the wireless access point operates under IEEE 802.11ax protocol.

15. A method comprising:
    assigning each data packet of a plurality of data packets to a respective queue of a first plurality of queues based at least in part on an identified application traffic flow for each data packet;

generating prioritized candidate lists for selected data packets selected from the first plurality of queues in a second plurality of queues, each queue of the second plurality of queues being dedicated for an access category (AC) for one or more application; and scheduling data packets from the prioritized candidate lists, including selecting one of a plurality of transmission modes for each access category based at least in part on characteristics of the one or more applications, wherein the plurality of transmission modes includes MU-MIMO (Multi-user Multiple-Input Multiple-Output) and OFDMA (Orthogonal Frequency Division Multiple Access).

16. The method of claim 15, wherein the selection of a transmission mode for an access category includes:

selecting MU-MIMO based at least in part on one or more applications requiring high bandwidth in operation; and selecting OFDMA based at least in part on one or more applications requiring low latency in operation.

17. The method of claim 15, wherein the plurality of transmission modes further includes SU-MIMO (Single User MIMO).

18. The method of claim 15, wherein each queue of the first plurality of queues is dedicated to data packets for a particular application profile.

19. The method of claim 15, further comprising:

allocating a virtual slice of Wi-Fi resources to each connected device based on policies per device, per user, or per user role.

20. The method of claim 15, further comprising:

receiving prioritization instructions for one or more applications and applying the prioritization instructions in the scheduling of the data packets.

* * * * *